United States Patent
Kobayashi et al.

(10) Patent No.: US 6,246,732 B1
(45) Date of Patent: Jun. 12, 2001

(54) DEMODULATOR INCLUDING ADAPTIVE EQUALIZER AND DEMODULATING METHOD IN DIGITAL COMMUNICATIONS

(75) Inventors: Takehiko Kobayashi, Kodaira; Yukinari Fujiwara, Musashimurayama, both of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/154,716

(22) Filed: Sep. 17, 1998

(30) Foreign Application Priority Data

Sep. 19, 1997 (JP) ..................................................... 9-255157

(51) Int. Cl.[7] .............................. H03D 1/04; H03D 3/00; H03K 9/00
(52) U.S. Cl. ........................... 375/346; 375/316; 329/315
(58) Field of Search ..................................... 375/346, 316, 375/349, 227, 229, 232, 233, 130, 284, 285, 341; 329/315, 319, 318, 349, 353

(56) References Cited

U.S. PATENT DOCUMENTS 5,673,294 * 9/1997 Namekata ............................. 375/341
6,075,808 * 6/2000 Tsujimoto ............................. 375/143

* cited by examiner

Primary Examiner—Chi Pham
Assistant Examiner—Khai Tran
(74) Attorney, Agent, or Firm—Antonelli, Terry, Stout & Kraus, LLP

(57) ABSTRACT

An apparatus comprising an unnecessary frequency component removal unit for removing unnecessary frequency components from a signal supplied from a detector, a unit for obtaining a measured value of delay spread of the signal supplied from the unnecessary frequency component removal unit, an adaptive equalizer for performing adaptive equalization on the signal supplied from the unnecessary frequency component removal unit, and a decoding unit for decoding an input signal, wherein the signal from the unnecessary frequency component removal unit is supplied to the decoding unit through the adaptive equalizer when the measured value of delay spread is larger than a predetermined value, whereas the signal from the unnecessary frequency component removal unit is supplied to the decoding unit without being passed through the adaptive equalizer when the measured value of delay spread is not larger than the predetermined value.

15 Claims, 11 Drawing Sheets

FIG. 6  EXAMPLE OF ERROR RATE CHARACTERISTIC IN CASE OF POOR C/N
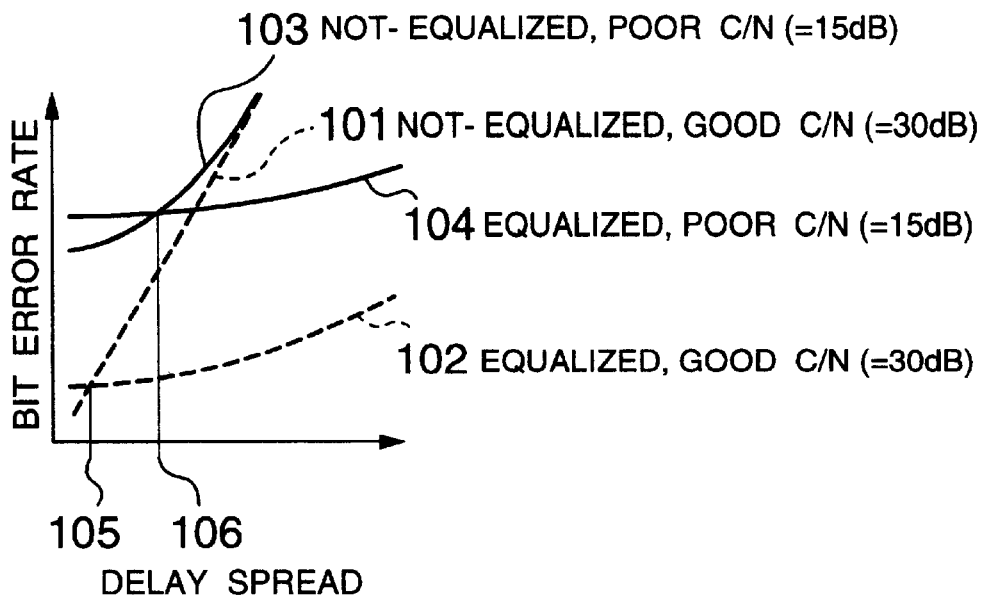
FIG. 7  EXAMPLE OF ERROR RATE CHARACTERISTIC IN CASE OF HIGH MAXIMUM DOPPLER FREQUENCY
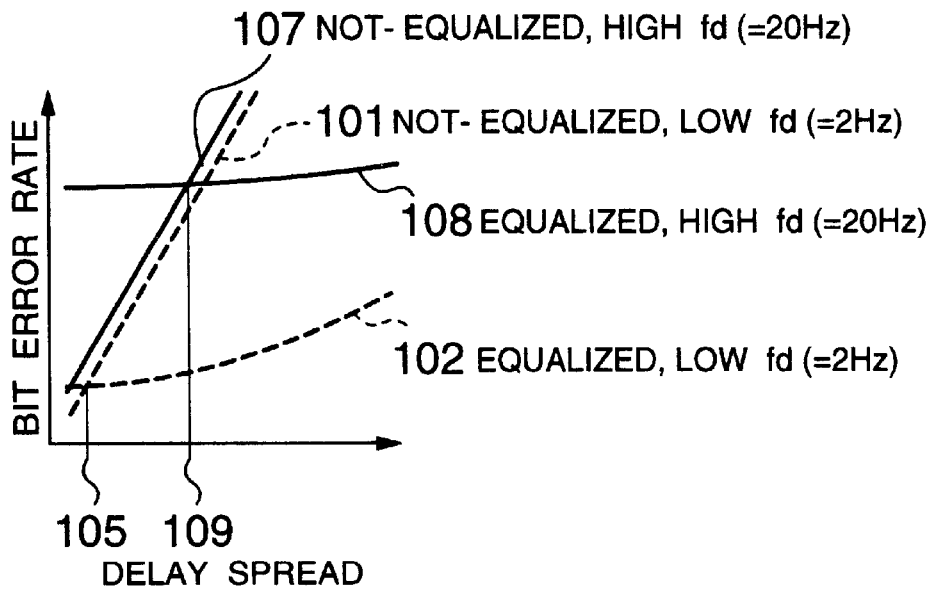

EXAMPLE OF RELATION AMONG C/N,
MAXIMUM DOPPLER FREQUENCY AND
DELAY SPREAD THRESHOLD

DEMODULATOR INCLUDING ADAPTIVE EQUALIZER AND DEMODULATING METHOD IN DIGITAL COMMUNICATIONS

BACKGROUND OF THE INVENTION

The present invention relates to a demodulator including an adaptive equalizer and a demodulating method, in digital communications.

In land mobile communications, out-of-sight radio communications are generally used. Accordingly, a received wave has a complex characteristic of being constituted by multiple waves which are much subjected to reflection, diffraction and scattering. In addition, the communication characteristic of a path channel varies instantaneously in accordance with the movement of a mobile station, so that communication quality is deteriorated. It is known that the variation in the communication characteristic generally accords with a Rayleigh distribution. This phenomenon is called "Rayleigh fading".

As a measure to cope with Rayleigh fading, particularly to cope with deterioration of communication quality caused by the instantaneous variation in amplitude, "diversity" is generally used. "Diversity" is a technique in which a received signal highest in received signal power among the several received signals is selected or synthesized from statistically independent received signals via a plurality of path channels to reduce the probability of lowering received signal power to thereby suppress the influence of Rayleigh fading. "Diversity" is classified into space diversity, directionality diversity, polarization diversity, etc., depending on the methods of selecting the independent received signal highest in received signal power. Further, "diversity" is classified into selection diversity, co-phasing combining diversity, maximal ratio combining diversity, etc., in accordance with the method of synthesizing independent received signals.

Because path channels constituting the above-mentioned plurality of path channels (multipath channels) have path channel lengths different from each other, the time of signal arrival at a reception point varies. The degree of this variation is called delay spread. The diversity is effective in the case where the delay spread is sufficiently small compared with transmission interval time per symbol, whereas bit error, so-called unrecoverable error, which is impossible to be compensated by only the diversity, occurs in the case where the delay spread is large.

FIG. 1 shows an example in which multipath channels in a base band are expressed by a model of time-variant filter. The reference numeral 1 designates a transmitted signal input terminal; 2-1, 2-2, ..., 2-M, delay elements; 3-0, 3-1, 3-2, ..., 3-M, coefficient multipliers; 4, an adder; and 5, a received signal output terminal. In FIG. 1, a transmitted symbol sequence supplied to the transmitted signal input terminal 1 is sent to the delay element 2-1 and the coefficient multiplier 3-0. Here, M delay elements 2-1, 2-2, ..., 2-M (M is an integer) are series-connected and each has a delay time Ts equal to the transmission interval time of one symbol. The signals of the transmitted symbol sequence supplied to the transmitted signal input terminal 1 are sent to the delay elements 2-1, 2-2, ..., 2-M successively. Signals are taken out from intermediate points between the delay elements 2-1 and 2-2, between the delay elements 2-2 and 2-3, ..., between the delay elements 2-(M-1) and 2-M and from the last stage of the delay element 2-M, respectively, and supplied to the coefficient multipliers 3-1, 3-2, ..., 3-M, respectively. The coefficient multipliers 3-0, 3-1, 3-2, ..., 3-M have complex coefficients $h_i$ (i=0, 1, 2, ..., M) which are set individually, so that the input signals are multiplied by the complex coefficients $h_i$ (i=0, 1, 2, ..., M), respectively. Results of the multiplications are added up by the adder 4, so that the resulting value is sent to the received signal output terminal 5 and is output therefrom. As represented by the model in FIG. 1, a received signal at a certain point of time is provided as a result of addition of a direct wave component based on transmitted symbols at a corresponding point of time and a delay wave component constituted by transmitted symbols before the corresponding point of time.

When the delay spread is large, the received signal is subjected to intersymbol interference by the delay wave component in accordance with the case where any one of the complex coefficients except the complex coefficient $h_0$ has a value of amplitude near the amplitude of the complex coefficient $h_0$ or a plurality of complex coefficients except the complex coefficient $h_0$ have values of amplitude near the amplitude of the complex coefficient $h_0$.

The intersymbol interference due to the delay spread in such a manner is a cause of bit error which brings serious deterioration of communication quality. To suppress this deterioration, an adaptive equalizer, for example, represented by a decision feedback equalizer or a Viterbi equalizer is required to be used.

Adaptive equalizers are classified into linear equalizers and maximum likelihood sequence estimators (MLSE). The decision feedback equalizer is known as a representative example of the linear equalizers and the Viterbi equalizer is known as a representative example of the maximum likelihood sequence estimators.

Incidentally, a conventional example of the decision feedback equalizer has been described, for example, in J. G. Proakis, "Digital Communications", McGraw-Hill International Editions, 1989, pp. 593–600.

The decision feedback equalizer will be described below as an example of the adaptive equalizers. FIG. 2 is a diagram showing an example of the configuration of the decision feedback equalizer. The reference numerals 6 and 8 designate multipliers; 7, an adder; 11, a digital received signal input terminal; 12 and 13, delay elements; 15, a symbol decision unit; 16, a reference signal memory; 17, a switch; 18, an error estimator; 19, a tap coefficient update unit; 20, an equalization output terminal; 21, a feed-forward portion (FF portion); 22, a feedback portion (FB portion); and 23, an equalization filter. In FIG. 2, each of the delay elements 13 has a delay time Ts equal to the transmission interval time per symbol, and each of the delay elements 12 has a delay time Tp equal to a value which is given by the delay time of the delay element 13 divided by an integer (generally, by 2). Further, the equalization filter 23 is constituted by an FF portion 21, an FB portion 22, and an adder 7. The FF portion 21 is constituted by delay elements 12 and multipliers 6. The FB portion 22 is constituted by delay elements 13 and multipliers 8. Complex coefficients F-j, F-j+1, ..., F0 called tap coefficients are set in the multipliers 6 respectively. Tap coefficients B1, B2, ..., BK are set in the multipliers 8 respectively.

Received signals sampled at a sampling interval Tp are supplied to the digital received signal input terminal 11, sent to the delay elements 12 of the FF portion 21 of the equalization filter 23 and successively multiplied by corresponding tap coefficients through the multipliers 6 respectively. At the same time, output signals of the switch 17 are sent to the FB portion 22 and successively multiplied by corresponding tap coefficients through the multipliers 8 respectively. All the results of these multiplications are sent to the adder 7 and added up by the adder 7, so that the resulting signal of addition is provided as an output of the equalization filter 23. Not only the output signal of the equalization filter 23 is sent to the decision unit 15 and the error estimator 18 but also the output signal is taken out from the equalization output terminal 20. The decision unit 15 decides what symbol is expressed by the input signal and sends the decided symbol to one input of the switch 17.

In digital communications, a fixed symbol sequence is generally inserted for the purpose of synchronization, or the like. This symbol sequence, which is known also to the receiving side, is stored, as a reference signal, in the reference signal memory 16.

Synchronization symbols are generally used as the training symbol sequence stored in the reference signal memory 16. FIG. 3 shows an example of the structure of frame data used in digital communications. In digital communications, besides a symbol sequence corresponding to an information bit sequence to be transmitted, generally, synchronization words having fixed symbol patterns are inserted mainly for the purpose of establishing various kinds of synchronization, so that fixed-length data called "frame" which is formed of a combination of the synchronization words and the information symbol sequence is used as a unit to be transmitted. In this description, the switch 17 is operated at a point of time when the synchronization word of a head frame is sent, that is, by the start of the head frame.

Generally, the switch 17 selects the output of the symbol decision unit 15 and selects the output of the reference signal memory 16 only in a period in which the transmitted symbol is known. The output of the switch 17 is sent to the FB portion 22 and the error estimator 18. The error estimator 18 estimates error of the output of the equalization filter 23 with the output signal of the switch 17 as a reference and sends the estimated error to the tap coefficient update unit 19. The tap coefficient update unit 19 updates all tap coefficients of the equalization filter 23 individually at all times so that the estimated error supplied to the tap coefficient update unit 19 is converged into zero. As a result of the aforementioned operation, the influence of intersymbol interference, caused by the delay spread, on the signal taken out from the equalization output terminal 20 is reduced. Accordingly, the tap coefficients are updated so that the equalization filter 23 has a characteristic reverse to the characteristic of the time-variant filter which is a model of path channels described above with reference to FIG. 1. The tap coefficient update unit 19 uses adaptation algorithm for updating coefficients. Typical examples of the adaptation algorithm include steepest-decent gradient algorithm, least mean square (LMS) algorithm, recursive least square (RLS) algorithm, etc.

FIG. 4 is a graph for explaining an example of the operation of the decision unit 15 and the error estimator 18. In FIG. 4, the abscissa axis shows in-phase component I and the ordinate axis shows quadrature component Q. A quadrature phase shift keying (QPSK) modulation system will be described below with reference to FIG. 4. Dots ①, ②, ③ and ④ on the I-Q plane represent symbols. X points marked with a, b, ..., h represent coordinates, on the I-Q plane, of input signals a, b, ..., h supplied to the decision unit 15. Assuming now that an input signal a is supplied to the decision unit 15, the decision unit 15 detects the coordinate, on the I-Q plane, of the input signal a as the X point marked with a. Because the detected coordinate is in the first quadrant of the I-Q plane, the decision unit 15 outputs a symbol ①. Similarly, in the case where the input is b, c or d, the decision unit 15 outputs the symbol ①. In the case where the input is e or f, the decision unit 15 outputs a symbol ②. In the case where the input is g, the decision unit 15 outputs a symbol ③. In the case where the input is h, the decision unit 15 outputs a symbol ④. Then, the error estimator 18 calculates the difference between the symbol supplied from the decision unit 15 and the signal supplied from the adder 7 and supplies the difference to the tap coefficient update unit 19. For example, when the output supplied from the adder 7 is a, the error estimator 18 outputs Ea in FIG. 4. Similarly, when the output supplied from the adder 7 is b, c, ..., h, the error estimator 18 outputs Eb, Ec, ..., Eh in FIG. 4.

As described above, a receiver strong against the instantaneous variation caused by Rayleigh fading and delay spread of a path channel characteristic can be formed by combination of "diversity" and an adaptive equalizer. The same rule as described above applies to other linear equalizers and maximum likelihood sequence estimators such as Viterbi equalizers.

As described above, the adaptive equalizer used in mobile radio communications requires a tracking characteristic in accordance with the instantaneous variation in the path channel characteristic. On the other hand, it is desired to avoid the influence of noise contained in the received signal. These tracking characteristic and noise resistance are characteristics about updating of tap coefficients but, generally, they have a trade-off relation with each other. That is, if a tracking characteristic is enhanced so as to be adapted to the higher-speed variation in the path channel characteristic caused by high-speed movement or high carrier frequency, the influence of noise becomes so large that error occurs in tap coefficients to bring adaptive equalizing error. Accordingly, in addition to noise contained in the received signal and intersymbol interference caused by delay spread, deterioration of equalization caused by this adaptive equalizing error is also required to be taken into consideration as a cause of communication deterioration. When balance between the quantity of improvement of intersymbol interference based on equalization and the quantity of deterioration of equalization under a noisy environment is taken into consideration, to use an adaptive equalization output in spite of unnecessity originally in the case where delay spread is so small that the influence of intersymbol interference is small, is to bring a cause of communication deterioration instead. Therefore, it is necessary to control the adaptive equalizing operation in accordance with the size of the delay spread. It may be said that this problem was apt to be overlooked conventionally because attention was paid to a point that a receiver was configured so as to be adapted to the case where the geographical condition of a mobile station was assumed to be most severe.

SUMMARY OF THE INVENTION

An object of the present invention is to provide a demodulator and a demodulation method by which the defects in the prior art can be eliminated.

Another object of the present invention is to provide a demodulator and a demodulation method which are used in digital communications so that not only communication quality is prevented from being spoiled in an ordinary good propagation environment but also intersymbol interference caused by delay spread is compensated when the delay spread is large.

A further object of the present invention is to provide a demodulator and a demodulation method using an adaptive equalizer for reducing the influence of intersymbol interference caused by delay spread of a path channel in digital communications, in which communication deterioration caused by equalizing error is prevented in the case where the delay spread is small to make the communication deterioration apt to become remarkable.

To achieve the foregoing objects, according to an aspect of the present invention, there is provided a demodulator for constituting a digital communication receiver, which comprises:

a detector for converting a digital received signal into a base band signal;

an unnecessary frequency component removal means for removing unnecessary frequency components from a signal supplied from the detector;

means for obtaining a measured value of delay spread of a signal supplied from the unnecessary frequency component removal means;

an adaptive equalizer for performing adaptive equalization on the signal supplied from the unnecessary frequency component removal means;

a decoding means for decoding an input signal; and means for supplying the signal from the unnecessary frequency component removal means to the decoding means through the adaptive equalizer when the measured value of delay spread is larger than a predetermined value, while supplying the signal from the unnecessary frequency component removal means to the decoding means without being passed through the adaptive equalizer when the measured value of delay spread is not larger than the predetermined value.

In such a manner, in the present invention, adaptive equalization is performed on the received signal after removal of the unnecessary frequency components and the resulting signal is decoded when the measured value of delay spread is larger than the predetermined value, whereas the received signal after removal of the unnecessary frequency components is decoded without performing any adaptive equalization when the measured value of delay spread is not larger than the predetermined value. Accordingly, deterioration of communication quality caused by equalizing error due to unnecessary adaptive equalization can be avoided when the delay spread is small, whereas the influence of intersymbol interference can be reduced by performing adaptive equalization when the delay spread is large. Consequently, a demodulator adapted to the condition such as a geometrical condition under which the demodulator is used can be achieved.

BRIEF DESCRIPTION OF THE DRAWINGS

FIG. 6 is a graph showing an example of the relations among delay spread, bit error rate (error rate characteristic) and C/N;

FIG. 7 is a graph showing an example of the relation among delay spread maximum Doppler frequency and error rate characteristic;

DESCRIPTION OF THE PREFERRED EMBODIMENTS

Figure 5:
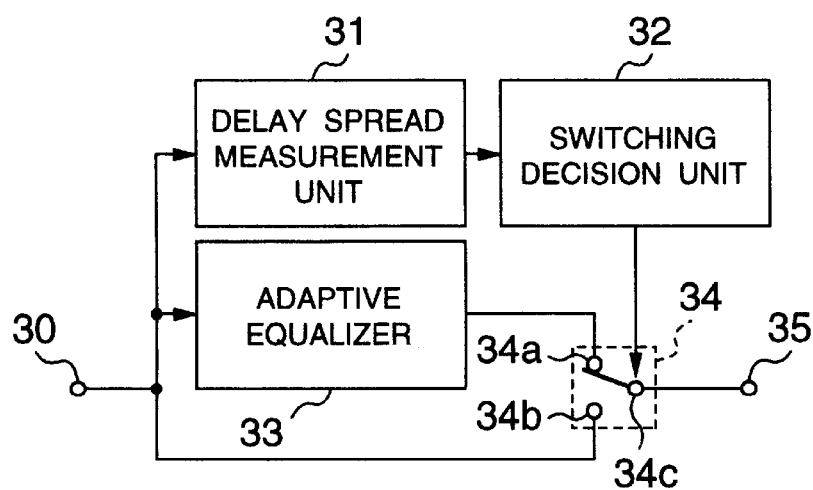
FIG. 5 is a block diagram showing an example of the configuration of an adaptive equalization unit which is a main part of a first embodiment of the demodulator according to the present invention.

Embodiments of the demodulator according to the present invention will be described below in detail with reference to the accompanying drawings. In the following embodiments, constituent parts having functions identical to each other are referenced correspondingly, and the duplicated description of the constituent parts are omitted. FIG. 5 is a block diagram showing an example of the configuration of an adaptive equalization unit which is a main part in a first embodiment of the demodulator according to the present invention. In this embodiment, a linear equalizer such as a decision feedback equalizer is used as an adaptive equalizer.

In FIG. 5, the reference numeral 30 designates a digital received signal input terminal; 31, a delay spread measurement unit; 32, a switching decision unit; 33, an adaptive equalizer; 34, a switch; and 35, an output terminal. A received signal is supplied to the digital received signal input terminal 30 and then sent to the delay spread measurement unit 31, to the switch 34 and to the adaptive equalizer 33. The delay spread measurement unit 31 obtains impulse response of a path channel on the basis of the received signal given from the input terminal 30, calculates delay spread on the basis of the obtained impulse response and outputs the delay spread. The switching decision unit 32 controls the switch 34 such as a switching element with reference to the given delay spread. For example, when the given delay spread is not larger than a set threshold, the switching decision unit 32 makes a decision that adaptive equalization is not necessary because deterioration caused by intersymbol interference is small. As a result, an output terminal 34c of the switch 34 is connected to an input terminal 34b so that the signal from the digital received signal input terminal 30 is directly output through the output terminal 35. On the contrary, when the given delay spread is larger than the set threshold, the output terminal 34c is connected to an input terminal 34a so that the output of the adaptive equalizer 33 is output through the output terminal 35.

By the aforementioned configuration, deterioration due to equalization error caused by unnecessary adaptive equalization can be avoided so that a receiver in accordance with the propagation condition under which the receiver is used can be formed. In the present invention, setting of the threshold becomes an important parameter which determines performance. The optimum value of the threshold intensively depends on the carrier-to-noise power ratio (C/N) and maximum Doppler frequency (fd) of the received signal. This point will be described below.

FIG. 6 is a graph schematically showing the relation (error rate characteristic) between the delay spread and the bit error rate (BER). The abscissa axis shows the value of delay spread and the ordinate axis shows BER. Both values are expressed in logarithmic scale. The curves 101 and 102 drawn by the broken line are curves in the case where C/N is good (large, in this case C/N=30 dB, for example). The former shows the error rate characteristic in the case where equalization is not effected, while the latter shows the error rate characteristic in the case where equalization is effected. In the case where equalization is not effected as represented by the curve 101, BER increases linearly, that is, BER deteriorates linearly as the delay spread increases. On the other hand, by performing equalization as represented by the curve 102, the quantity of improvement by equalization becomes remarkable as the delay spread increases while deterioration due to equalization is observed when the delay spread is small. The optimum value of the threshold of delay spread in this case is a value represented by the reference numeral 105 which designates an intersection between the curves 101 and 102. That is, in the present invention, in this case, a non-equalized signal (curve 101) is selected when the delay spread is smaller than the value represented by the reference numeral 105 whereas an equalized signal (curve 102) is selected when the delay spread is larger than the value represented by the reference numeral 105.

On the other hand, the curves 103 and 104 drawn by the solid line are curves in the case where received signal power is small and C/N is poor (small, in this case, C/N=15 dB, for example). Similarly, the former shows the error rate characteristic in the case where equalization is not effected, while the latter shows the error rate characteristic in the case where equalization is effected. As represented by the curve 103, deterioration due to noise is observed when the delay spread is small but the deterioration due to noise becomes predominant as the delay spread increases. In the case of the equalized output as represented by the curve 104, the influence of noise does not depend on the quantity of delay spread so much. Although the error rate characteristic may vary in accordance with algorithm for configuring the equalizer, generally, it is provided as represented by the curve 104. The optimum value of the threshold in this case shifts to a value represented by the reference numeral 106 which designates an intersection between the curves 103 and 104. In such a manner, the threshold is necessary to increase as C/N becomes poor.

The relation between the maximum Doppler frequency fd and the error rate characteristic will be described below. FIG. 7 is a graph schematically showing the relation between the delay spread and BER in the case where fd is low and the relation in the case where fd is high. In FIG. 7, the abscissa axis, the ordinate axis, the curves 101 and 102, and the threshold 105 are expressed in the same manner as shown in FIG. 6. In this figure, the curves 101 and 102 represent cases where the frequency fd is low (in this case, fd=2 Hz, for example) and curves 107 and 108 represent cases where the frequency fd is high (in this case, fd=20 Hz, for example). Further, the curves 101 and 107 represent cases where equalization is not effected, while the curves 102 and 108 represent cases where equalization is effected. When an ordinary measure, such as "diversity", or the like, is taken to cope with fading without effecting equalization, the deterioration in error rate is slight so that the curve 101 merely varies to the curve 107 even if the frequency fd becomes high. When equalization is effected, however, tracking performance of the equalizer in accordance with the variation of the path channel characteristic has a limit point so that bit error occurs like a burst if the frequency fd is increased to be higher than this limit point. Accordingly, deterioration occurs suddenly so as to vary from the curve 102 to the curve 108. Accordingly, the optimum value of the threshold shifts from the point designated by the reference numeral 105 to a point designated by the reference numeral 109. In such a manner, the threshold is required to increase as the frequency fd increases.

Figure 8:
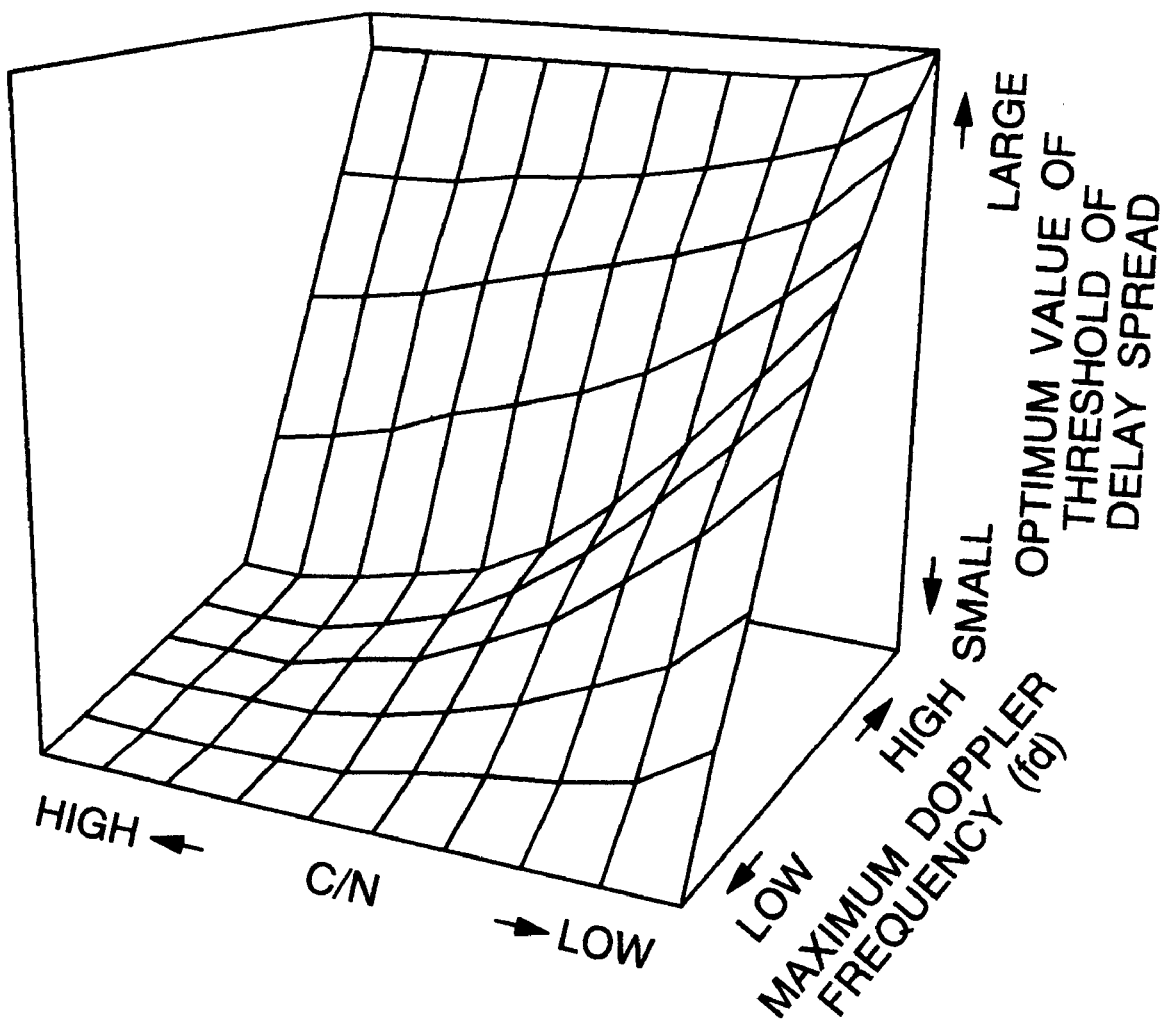
FIG. 8 is a graph showing the relations among C/N, maximum Doppler frequency and the optimum value of the delay spread threshold.

As described above, the threshold is required to be set under the consideration of C/N and the maximum Doppler frequency. FIG. 8 is a graph schematically showing the relations among C/N, the maximum Doppler frequency and the optimum value of the threshold. It is apparent that the threshold of delay spread is required to be set to be high as C/N decreases or as the maximum Doppler frequency increases. Accordingly, to carry out the present invention, besides means for measuring delay spread, means for measuring C/N and means for measuring the maximum Doppler frequency are also required.

Figure 9:
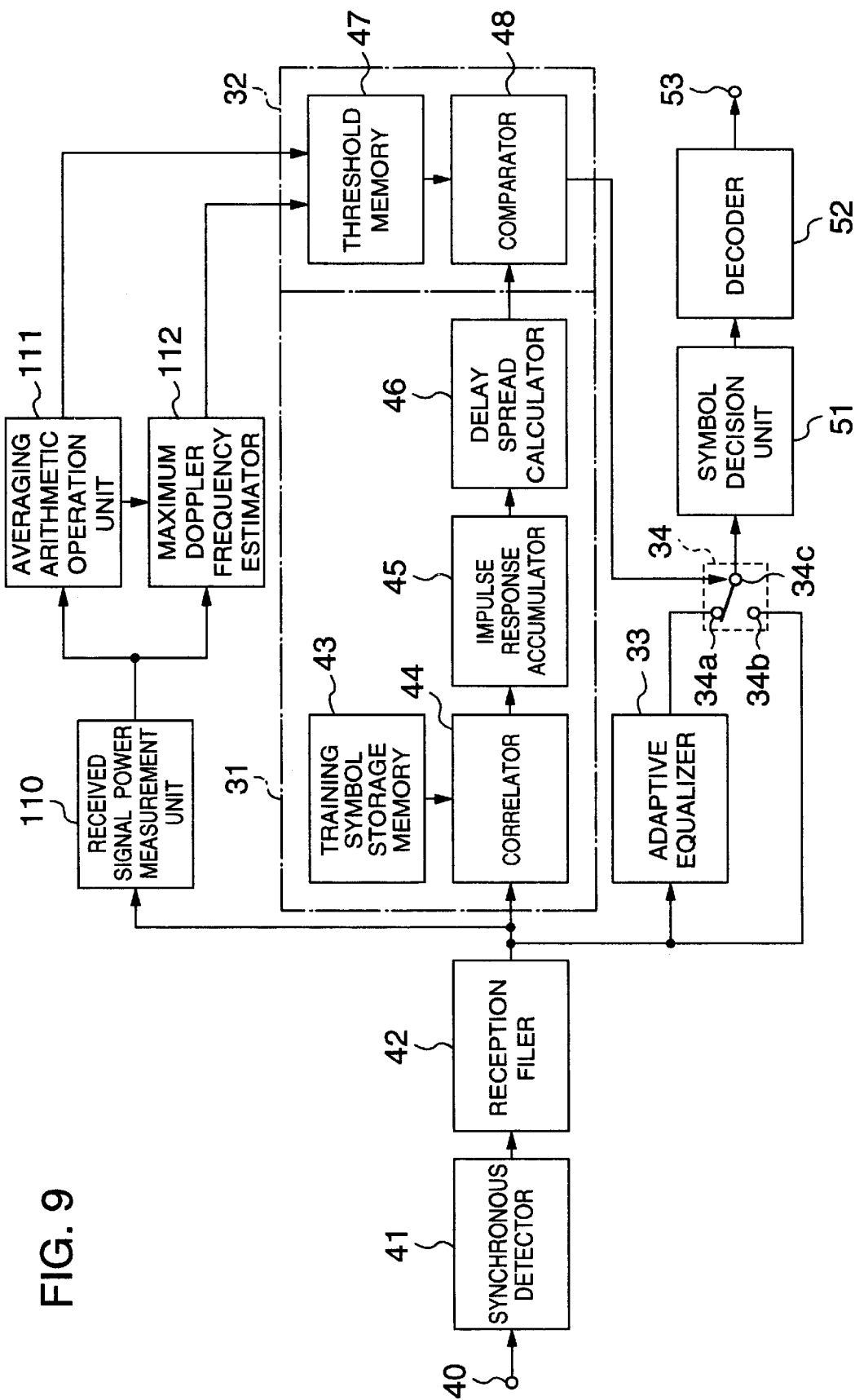
FIG. 9 is a block diagram showing an example of the configuration of the first embodiment of the demodulator according to the present invention.
Figure 10:
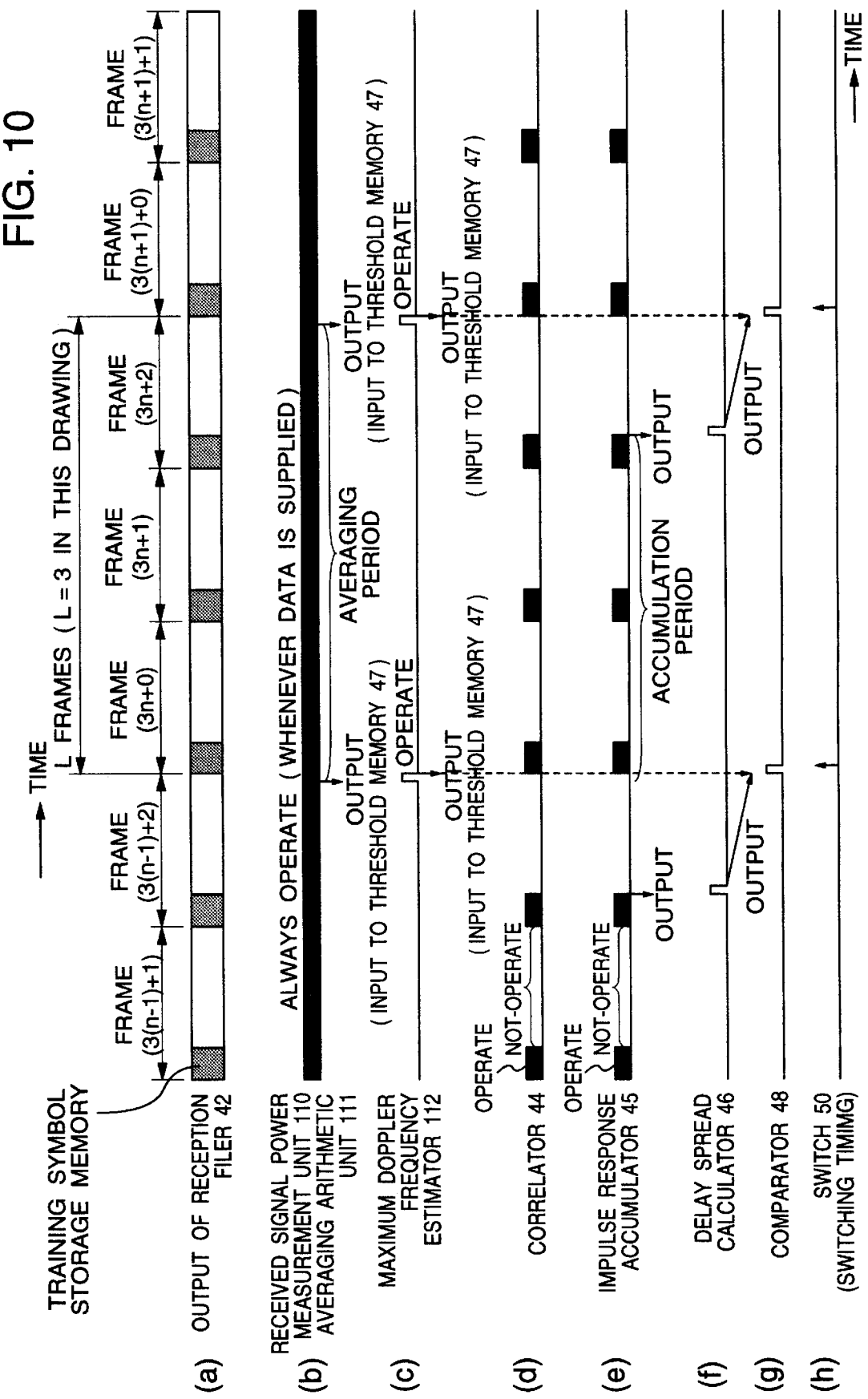
FIG. 10 is a timing chart showing the operation timing of main constituent parts of the demodulator depicted in FIGS. 9 and 14.

FIG. 9 is a block diagram showing the configuration of a first embodiment of the demodulator configured according to the present invention under the consideration of the aforementioned point. FIG. 10 is a timing chart showing the operation timing of main constituent parts of the demodulator depicted in FIG. 9.

In FIG. 9, the reference numeral 40 designates a received signal input terminal; 41, a coherent detector; 42, a reception filter which is an unnecessary frequency component removal means; 43, a training symbol storage memory; 44, a correlator; 45, an impulse response accumulator; 46, a delay spread calculator; 47, a threshold memory; 48, a comparator; 33, an adaptive equalizer; 34, a switch; 51, a symbol decision unit; 52, a decoder; 53, a data output terminal; 110, a received signal power measurement unit; 111, an averaging arithmetic operation unit; and 112, a maximum Doppler frequency estimator. The delay spread measurement unit 31 described above with reference to FIG. 5 is equivalent to a portion composed of the training symbol storage memory 43, the correlator 44, the impulse response accumulator 45 and the delay spread calculator 46. The switching decision unit 32 shown in FIG. 5 is equivalent to a portion composed of the threshold memory 47 and the comparator 48.

A received signal supplied through the received signal input terminal 40 is subjected to synchronous detection, that is, converted into a base band signal by the coherent detector 41. Then, unnecessary frequency components are removed from the coherently detected signal by the reception filter 42. The resulting signal is sent from the reception filter 42 to each of the received signal power measurement unit 110, the correlator 44, the adaptive equalizer 33 and the switch 34. The output of the reception filter 42 is generally expressed by a complex number having an in-phase component (I) and a quadrature component (Q). It is now assumed that the output at a certain point of time n is Xn and the I and Q components of the output Xn are In and Qn, respectively.

In the received signal power measurement unit 110, instantaneous power Rn of the received signal is measured. That is, the following arithmetic operation is carried out and the Rn is output as a result.

$$Rn = In^2 + Qn^2 \tag{1}$$

Figure 11:
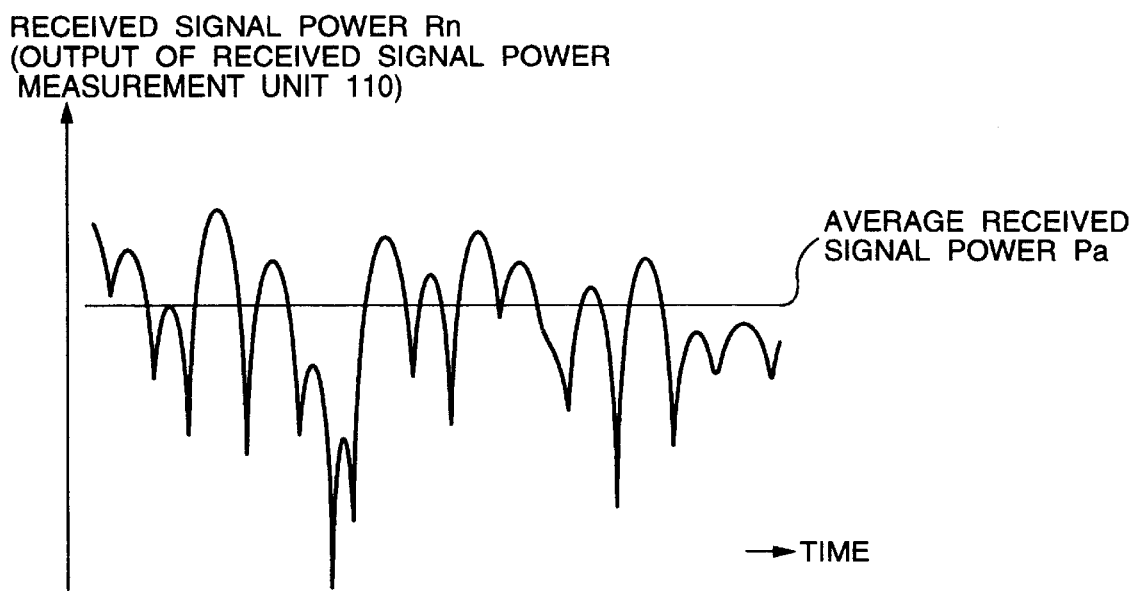
FIG. 11 is a graph showing an example of the output of the received signal power measurement unit depicted in FIG. 9.

In mobile radio communications, instantaneous power varies intensively because of the influence of fading resulting from movement. FIG. 11 is a graph showing this condition in which the output Rn of the measurement unit 110 varies. To set the optimum value of the threshold of delay spread, C/N is required to be estimated. C/N is the ratio of received signal power to noise power. The noise power generally has a value peculiar to the receiver, which is related to the noise figure. Accordingly, C/N can be estimated by obtaining average received signal power in a certain period (for example, a period of L frames (L is a positive integer, for example, 3)) and dividing the obtained average value of received signal power by the noise power obtained previously. Therefore, the averaging arithmetic operation unit 111 obtains the average of measured values of instantaneous power from the received signal power measurement unit 110 to give the obtained average, as average received signal power, to the maximum Doppler frequency estimator 112, and obtains the estimated value of C/N by dividing the average received signal power by noise power to give the estimated value of C/N to the threshold memory 47.

Figure 12:
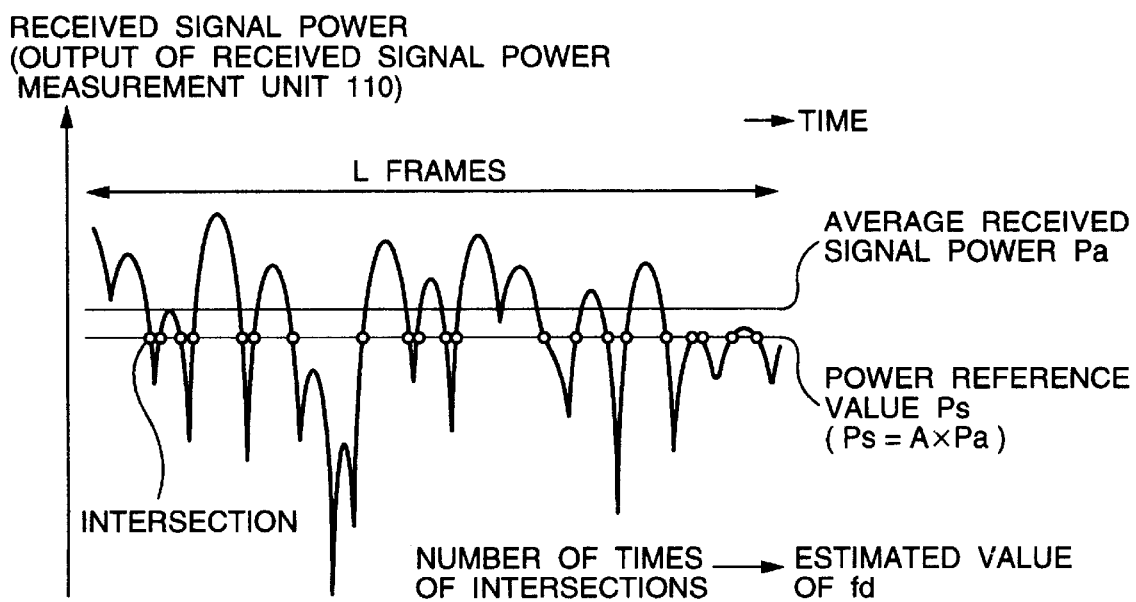
FIG. 12 is a graph for explaining the principle of the operation of the maximum Doppler frequency estimator depicted in FIG. 9.
Figure 13:
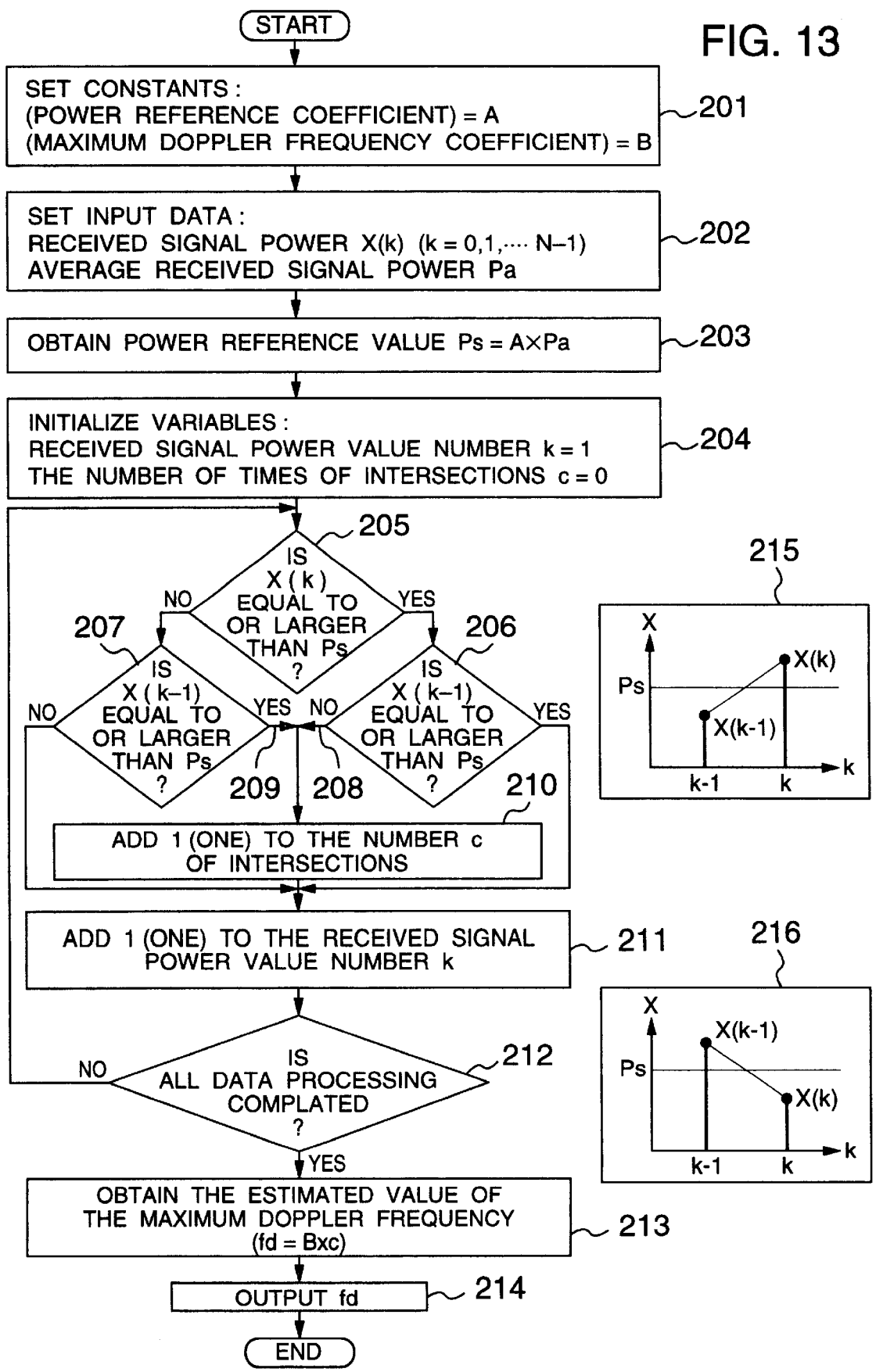
FIG. 13 is a flow chart for explaining the operation of the maximum Doppler frequency estimator depicted in FIG. 9.

At the same time, the maximum Doppler frequency which is necessary for setting the threshold, is estimated by the maximum Doppler frequency estimator 112. FIG. 12 is a graph for explaining one of operation principles of the maximum Doppler frequency estimator 112 depicted in FIG. 9. There is used a property in which the average number of times of intersections per unit time between the received signal power and a certain power level is proportional to the maximum Doppler frequency when the change of received signal power (the output of the measurement unit 110) with movement accords with a Rayleigh distribution. That is, in FIG. 12, a value obtained by multiplying the average received signal power Pa in a certain period by an arbitrary power reference coefficient A is defined as a power reference value Ps, so that the number of times of intersections per unit time (for example, the time of L frames) between the received signal power and the power reference value is obtained. FIG. 13 shows a flow chart of a process for achieving this operation principle.

First, constants are prepared as shown in step 201. That is, the power reference coefficient A and the maximum Doppler frequency coefficient B which is defined by the ratio of the maximum Doppler frequency to the average number of times of intersections are prepared. These coefficients A and B are determined appropriately in advance by theoretical calculation, simulation, or the like. Then, as shown in step 202, received signal power X(k) of data length N sent from the received signal power measurement unit 110 in FIG. 9 (and FIG. 14), and average received signal power Pa sent from the averaging arithmetic operation unit 111 in FIG. 9 (and FIG. 14) are used as input data. In step 203, the aforementioned power reference value Ps is calculated. In step 204, variables used in this process are initialized. After the aforementioned preparation, step 205 and steps after the step 205 are carried out. In the k-th process, a judgment is made by the judgment process in steps 205 to 207 as to whether X crosses Ps before the number (k−1) reaches k. That is, when the situation of the process reaches the route shown in step 208, a decision can be made that X intersects Ps upward just before the number reaches k as shown in step 215. Similarly, when the situation of the process reaches the route shown in step 209, a decision can be made that X intersects Ps downward as shown in step 216. When a decision is made that X intersects Ps, the number of times of intersections c is increased by one in step 210. In steps 211 and 212, a series of routines is carried out unless the received signal power X(k) reaches the final value. At the point of time when the series of routines is completed, the maximum Doppler frequency fd is estimated on the basis of the number of times of intersections c in step 213 and output in step 214.

This output in the step 214 is another input of the threshold memory 113 similarly to the output of the arithmetic averaging operation unit 111.

The maximum Doppler frequency estimator 112 for carrying out the aforementioned process may be constituted, for example, by a wired logic circuit or by a micro-computer.

As described above, optimum values of the threshold of delay spread corresponding to C/N and the maximum Doppler frequency fd as shown in FIG. 8 are stored in the threshold memory 47 in advance. An optimum value of the threshold of delay spread corresponding to the C/N from the averaging arithmetic operation unit 111 and the maximum Doppler frequency fd from the maximum Doppler frequency estimator 112 is supplied to the comparator 48. An RAM such as a three-dimensional map memory may be used as the memory 47. Because the optimum value of the threshold varies in accordance with the algorithm of adaptive equalization, the configuration of the adaptive equalizer, parameters for adaptive equalization, etc., characteristics as shown in FIGS. 6, 7 and 8 are obtained by simulation or experiment and stored in the memory in advance.

Incidentally, because the average received signal power has a predetermined relation with C/N, the optimum value of the threshold of delay spread may be obtained corresponding to the average received signal power and the maximum Doppler frequency fd. In this case, optimum values of the threshold of delay spread corresponding to the average received signal power and the maximum Doppler frequency fd may be obtained and stored in the threshold memory 47 in advance so that an optimum value of the threshold of delay spread can be output corresponding to the average received signal power from the averaging arithmetic operation unit 111 and the maximum Doppler frequency fd from the maximum Doppler frequency estimator 112.

On the other hand, in the correlator 44 shown in FIG. 9, an arithmetic operation is carried out for obtaining correlation between the input signal Xn and the training symbol sequence Ai which is stored in the training symbol storage memory 43. That is, the correlator 44 performs the following calculation:

$$C_i = \left( \sum_{k=0}^{M-1} X_{i+k} A_k^* \right)^2 \tag{2}$$

in which $A_k^*$ expresses a complex number conjugate to $A_k$, and M expresses the length of the training symbol sequence. $C_i$ means the instantaneous value of impulse response of the path channel from the transmitting side to the receiving side. The impulse response instantaneous value is sent to the impulse response accumulator 45. The input impulse response instantaneous value is accumulated in a period of specific frames, e.g. L frames, so that instantaneous variation components are removed from the impulse response instantaneous value to suppress error components. The resulting value is sent as accumulated impulse response Pi (i=0, 1, 2, . . . , L) to the delay spread calculator 46. In the delay spread calculator 46, delay spread is calculated as follows.

When the delay time of the i-th response is $\tau_i$ (i=0, 1, 2, ..., L), the average delay time D is defined with respect to the accumulated impulse response $P_i$ (i=0, 1, 2, ..., L) by the equation (3).

$$D = \frac{1}{E}\sum_{i=0}^{L} P_i \tau_i \tag{3}$$

In the equation (3), E is the whole power of impulse response and given by the equation (4).

$$E = \sum_{i=0}^{L} P_i \tag{4}$$

By using the average delay time D, delay spread S is obtained by the equation (5). The delay spread S has the same dimensions as time.

$$S = \sqrt{\frac{1}{E}\sum_{i=0}^{L} P_i(\tau_i - D)^2} \tag{5}$$

The delay spread S thus calculated is sent to the comparator 48. The comparator 48 compares the input delay spread with the delay spread threshold read from the threshold memory 47 and controls the switch 34 in accordance with a result of the comparison. That is, the output terminal 34c of the switch 34 is connected to the input terminal 34a when the delay spread is larger than the threshold, whereas the output terminal 34c is connected to the input terminal 34b when the delay spread is not larger than the threshold.

The adaptive equalizer 33 performs adaptive equalization with respect to the input signal and sends a result of the equalization to the input terminal 34a of the switch 34. The output signal of the switch 34 is sent to the symbol decision unit 51 in which what symbol is expressed by the output signal is decided in accordance with the modulating method. A result of the decision is sent to the decoder 52 and converted into bit information of "0" or "1", so that the bit information is output through the data output terminal 53.

In the embodiment shown in FIG. 9, an equalizer represented by a linear equalizer or a decision feedback equalizer, in which a received signal is output after intersymbol interference components are removed from the received signal, is assumed as the adaptive equalizer 33. As another configuration of the adaptive equalizer, there is a maximum likelihood sequence estimator. This is means for selecting the highest-probability symbol sequence from symbol sequences which are allowed to be transmitted, under the consideration of the presence of intersymbol interference components with respect to symbol sequences of a predetermined length. There is an equalizer called Viterbi equalizer because Viterbi algorithm is generally used in this means for the purpose of carrying out an arithmetic operation efficiently.

Figure 2:
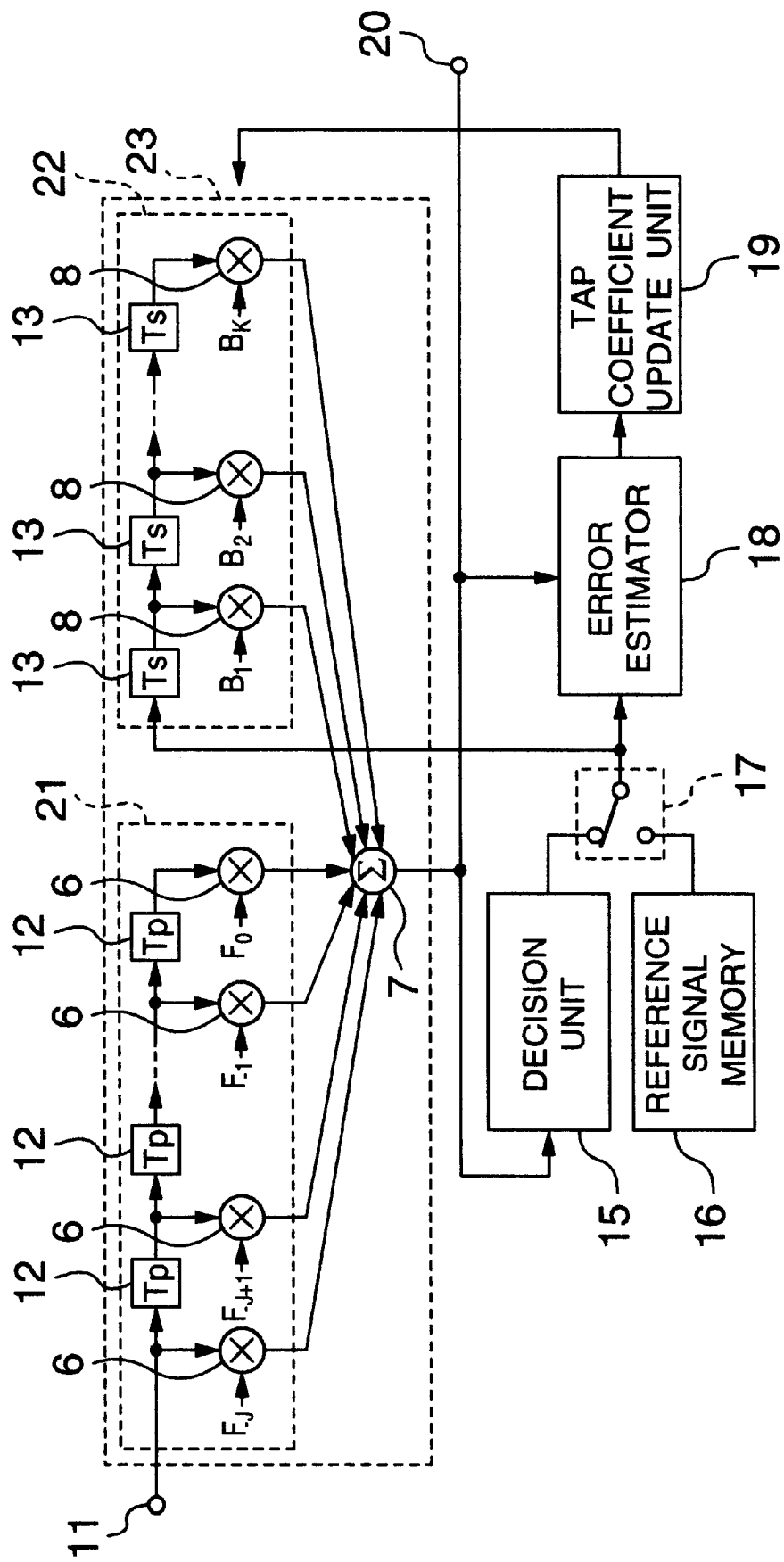
FIG. 2 is a block diagram showing an example of the configuration of a decision feedback equalizer in the prior art.
Figure 4:
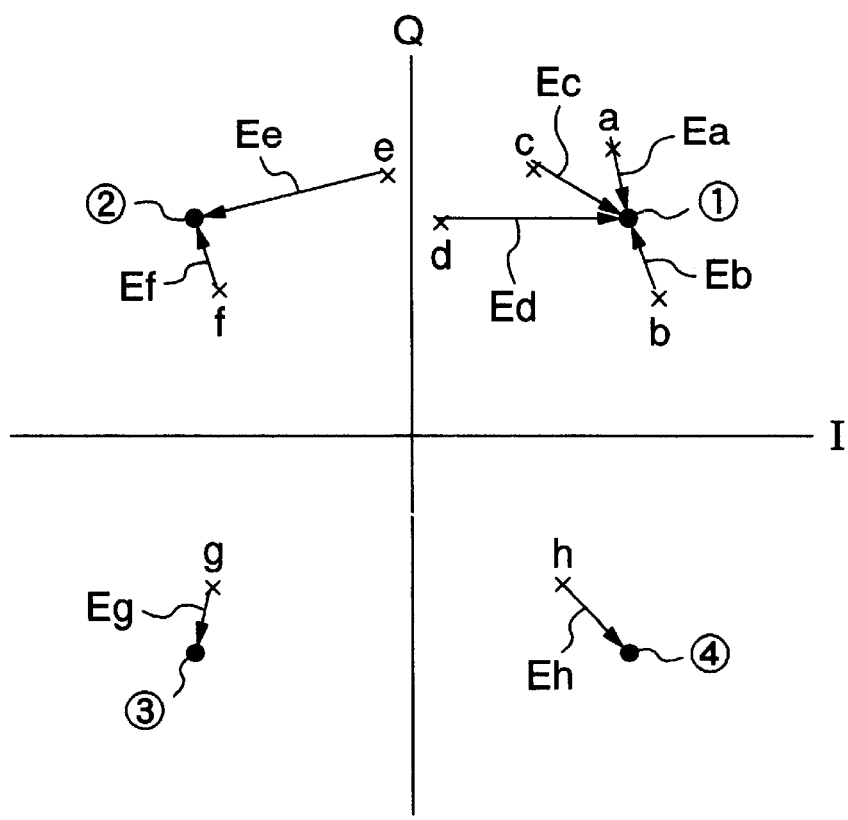
FIG. 4 is a graph for explaining the operation of the decision unit and the error estimator in FIG. 2.
Figure 14:
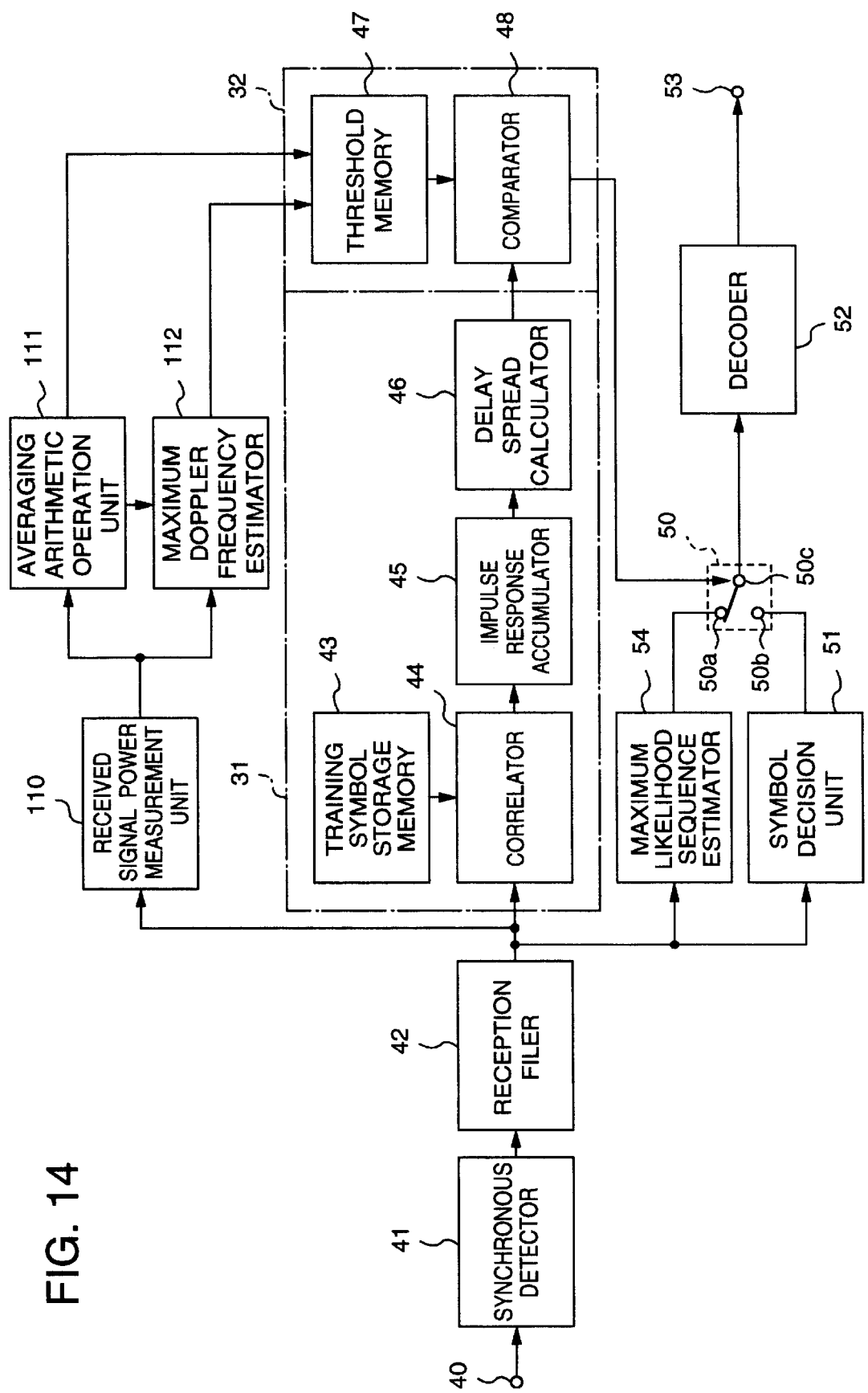
FIG. 14 is a block diagram showing an example of the configuration of a second embodiment of the demodulator according to the present invention.

In the present invention, the maximum likelihood sequence estimator can be used as the adaptive equalizer. FIG. 14 shows an embodiment of the maximum likelihood sequence estimator. In FIG. 14, constituent parts except for the portions in the vicinity of the adaptive equalizer are equivalent to those in FIG. 9, and are referenced correspondingly. The reference numeral 54 designates a maximum likelihood sequence estimator such as a Viterbi equalizer. The output of the reception filter 42 is sent to the received signal power measurement unit 110, the correlator 44, the maximum likelihood sequence estimator 54 and the symbol decision unit 51. The operations of the received signal power measurement unit 110, the correlator 44 and a portion thereafter are the same as those in FIG. 9. The maximum likelihood sequence estimator 54 estimates the highest-probability symbol sequence as a transmitted symbol sequence from the input signal and sends the symbol sequence to the input terminal 50a of the switch 50. Further, the symbol decision unit 51 (having the same function as the decision unit 15 in FIG. 2) decides symbols from the input signal successively and sends the resulting symbol sequence to the input terminal 50b of the switch 50. Further, a threshold suitable for the maximum likelihood sequence estimator is stored in the threshold memory 47 under the consideration of the performance of the maximum likelihood sequence estimator. A result selected by the switch 50 is sent to the decoder 52 and converted into bit information of "0" or "1", so that the bit information is output through the data output terminal 53, in the same manner as in FIG. 5.

FIG. 10 is a timing chart showing operation timing in the embodiments shown in FIGS. 9 and 14. Data are always output from the reception filter 42 at regular sampling intervals. A training symbol sequence (generally, synchronization word sequence) is disposed in the head of each frame ((a) in FIG. 10). The received signal power measurement unit 110 carries out the arithmetic operation expressed by the equation (1) whenever data is output from the reception filter 42. The averaging arithmetic operation unit 111 averages results of the arithmetic operation in a period of L (for example, L=3) frames. The maximum Doppler frequency estimator 112 estimates the maximum Doppler frequency in the period of L frames by using the output of the received signal power measurement unit 110 in the period of L frames and the output of the averaging arithmetic operation unit 111. The output of the averaging arithmetic operation unit 111 and the output of the maximum Doppler frequency estimator 112 are used as inputs of the threshold memory 47.

On the other hand, the correlator 44 operates to obtain impulse response of a path channel substantially in a period in which a training symbol sequence is output from the reception filter 42. Results of the correlator 44 are accumulated, for example, over L frames by the impulse response accumulator 45. At the point of time when the accumulation is completed, the accumulated value is sent to the delay spread calculator 46, in which delay spread in the accumulation period is calculated. The output value of the delay spread calculator 46 is kept until the input of the threshold memory 47 is set. Then, the output value of the delay spread calculator 46 is compared with the output of the threshold memory 47 by the comparator 48. The comparator 48 controls the switch 50 in accordance with the result of the comparison.

Figure 1:
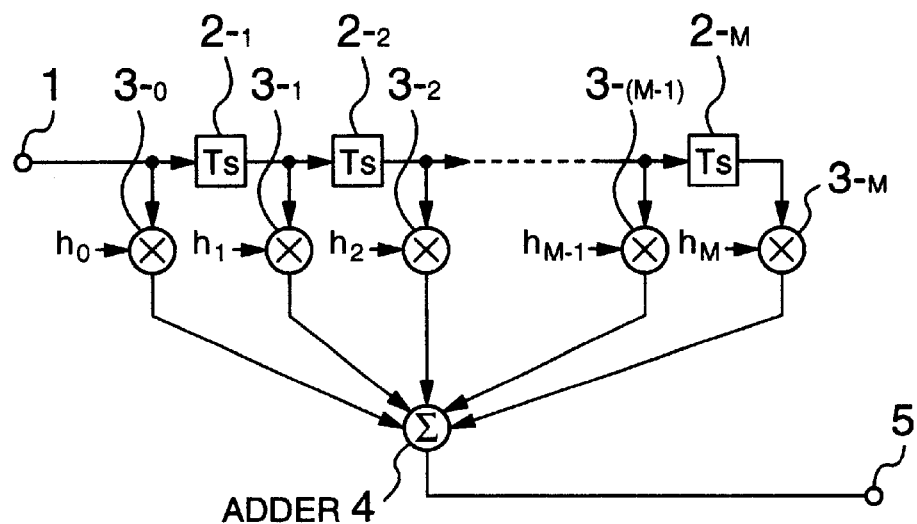
FIG. 1 is a block diagram showing path channels having delay spread as an example of a model of time-variant filter.
Figure 3:
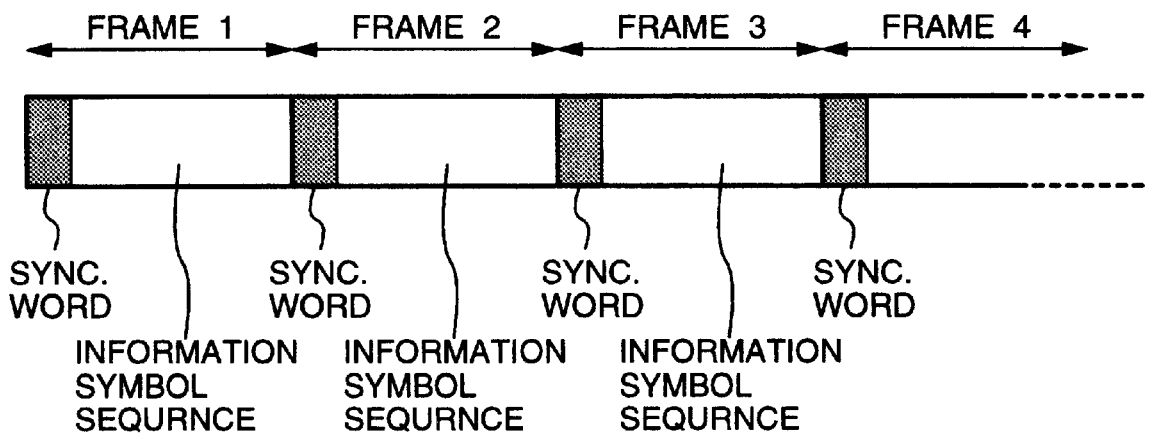
FIG. 3 is a view showing a conventional example of the structure of frame data of a digital signal used in digital communications.

Incidentally, as described in the prior art with reference to FIG. 3, synchronization symbols can be used as the training symbol sequence stored in the training symbol storage memory 43. Accordingly, impulse response is obtained at the point of time when a synchronization word shown in FIG. 3 is transmitted, and the obtained impulse response is accumulated frame by frame, so that the value of delay spread can be obtained by using results of accumulation in several frames. There is, however, a fear that the number of times of accumulations cannot be kept sufficient in the initial frame of the received digital signal and, accordingly, the value of delay spread becomes incorrect because of the influence of noise and instantaneous variation components to make the correct switching operation impossible. Therefore, the digital signal in the present invention employs such a frame structure as shown in FIG. 15.

Figure 15:
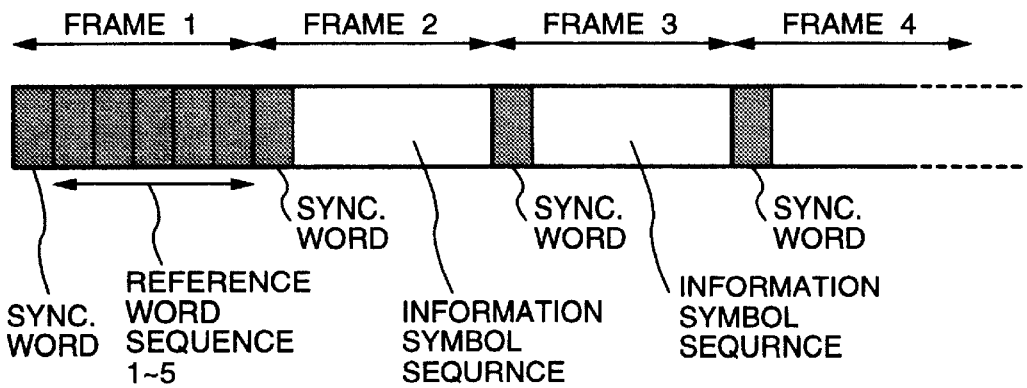
FIG. 15 is a view showing an example of the structure of frames of a digital signal in the present invention.

FIG. 15 shows the case where a frame 1 composed of a synchronization symbol sequence and a reference symbol (training symbol) sequence which is divided into several parts, for example, 5 parts, is added to the head of the frame structure shown in FIG. 3. In this case, for example, the training symbol storage memory 43 employs a configuration shown in FIG. 16, in the embodiment shown in FIGS. 9 and 12 corresponding to the addition of the frame 1.

Figure 16:
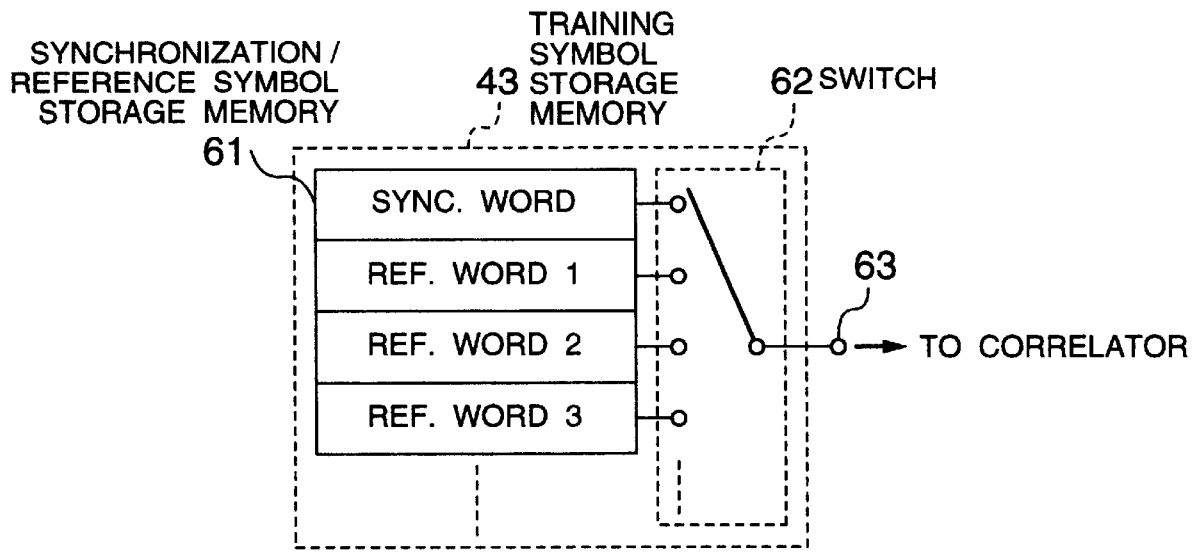
FIG. 16 shows an example of the configuration of the training symbol storage memory in the demodulator according to the present invention.

In FIG. 16, the reference numeral 43 designates a training symbol storage memory; 61, a synchronization/reference symbol storage memory; 62, a switch; and 63, a memory data output terminal. A synchronization word which is inserted in each frame in FIG. 15 and reference words which are contained in the head frame 1 are stored in individual positions of the synchronization/reference symbol storage memory 61. The switch 62 is operated (or address control is simply performed) in synchronism with the input timing of the synchronization word to the correlator 44 in FIGS. 9 and 14 so that the synchronization and reference words are read from the memory 61 successively and the synchronization and reference words are supplied to the correlator 44 through the memory data output terminal 63 to thereby operate the correlator 44. By this operation, the frame (frame 1 in FIG. 15) containing no information symbol to be transmitted is added. Accordingly, the number of times of accumulations of impulse response is effectively increased though there is a defect that time redundancy increases. Accordingly, impulse response can be converged collectively so that appropriate control can be performed from the second frame.

In the embodiment shown in FIG. 9, the adaptive equalizer 33 and the switch 34 are provided separately. Alternatively, a bypass may be provided in the inside of the adaptive equalizer 33 so that the switch 34 can be omitted. In this case, the adaptive equalizer 33 may be controlled to be switched on and off in accordance with the signal supplied from the comparator 48. That is, a bypass may be provided so that the signal from the reception filter 42 is given to the symbol decision unit 51 through the adaptive equalizer 33 when the delay spread is larger than the threshold, and, on the other hand, the adaptive equalizer 33 is switched off to supply the signal from the reception filter 42 to the symbol decision unit 51 through the bypass without being passed through the adaptive equalizer 33 when the delay spread is not larger than the threshold.

Alternatively, the operation of updating tap coefficients of the adaptive equalizer 33 may be controlled in accordance with the signal of the comparator 48. That is, in the case of a decision feedback equalizer shown in FIG. 2, an ordinary tap coefficient updating operation is carried out when the delay spread is larger than the threshold, and on the other hand, the tap coefficient update unit 19 forcedly sets a coefficient $F_0$ to 1 and all the other coefficients to 0 when the delay spread is not larger than the threshold. The same effect as that in the method using a bypass can be therefore obtained by this method.

Although the aforementioned embodiments have been described about the case where a coherent detector 41 is used as the detector, any type of detector may be used so long as the detector is a quasi-coherent detector which converts the received signal into a base band signal (equivalent low-pass signal).

Further, although the aforementioned embodiments have been described about the case where an arithmetic operation of correlation of a training symbol sequence is used as a method of estimating impulse response of a path channel to obtain the value of delay spread, any other estimating method, for example, recursive least square (RLS) algorithm, can be used. In the case where the RLS algorithm is used, estimation accuracy can be enhanced though the quantity of the arithmetic operation increases.

In the embodiments shown in FIGS. 9 and 14, constituent elements after the reception filter 42, that is, a portion of constituent elements for processing the base band signal may be constituted by a wired logic circuit or a micro-computer. In the case where the portion is constituted by a micro-computer, for example, in the embodiment shown in FIG. 9, each of the memories 43 and 47 may be constituted by a memory such as an RAM, or the like, and the constituent elements 44 to 48, 33, 34, 51, 52, and 110 to 112 may be replaced by a CPU so that the operations of these constituent elements are controlled by a program stored in an ROM as described above.

As described above, according to the embodiments of the present invention, the operation of a demodulation portion can be controlled adaptively on the basis of the comparison between the quantity of communication deterioration caused by intersymbol interference caused by delay spread and the quantity of improvement based on the adaptive equalizer introduced to avoid the communication deterioration, and on the basis of the consideration of deterioration caused by adaptive equalizing error.

Further, by combining the present invention with "diversity", a receiver not only tolerating both noise and delay spread but also tolerating received signal power dropping caused by fading can be configured.

What is claimed is:

1. A demodulator for constituting a digital communication receiver, comprising:

a detector for converting a digital received signal into a base band signal;

an unnecessary frequency component removal means for removing unnecessary frequency components from a signal supplied from said detector thereby to output a signal from which the unnecessary components has been thus removed;

a delay spread calculation means for obtaining a measured value of delay spread of the output signal supplied from said unnecessary frequency component removal means;

a threshold storage means storing a threshold of delay spread therein;

an adaptive equalizer for performing adaptive equalization on the output signal supplied from said unnecessary frequency component removal means;

a decoding means for decoding an input signal; and a switching means; wherein said delay spread calculation means includes:

a training symbol storage means storing a training symbol therein;

means for obtaining impulse response of a path channel of said received signal on the basis of said training symbol supplied from said storage means and the output signal supplied from said unnecessary frequency component removal means; and means for obtaining a measured value of delay spread on the basis of the obtained impulse response; and wherein said switching means supplies the output signal from said unnecessary frequency component removal means to said decoding means through said adaptive equalizer when the obtained measured value of delay spread is larger than the threshold stored in said threshold storage means, while supplies the output signal from said unnecessary frequency component removal means to said decoding means without being passed through said adaptive equalizer when the obtained measured value of delay spread is not larger than said threshold.

2. A demodulator according to claim 1, wherein said means for obtaining impulse response includes:

means for obtaining an instantaneous value of impulse response of a path channel of said received signal on the basis of said training symbol supplied from said training symbol storage means and the output signal supplied from said unnecessary frequency component removal means; and means for removing instantaneous response components from the obtained instantaneous value of impulse response and suppressing noise components in said obtained instantaneous value of impulse response to thereby obtain impulse response of a path channel of said received signal.

3. A demodulator according to claim 1, wherein said means for obtaining impulse response includes:

a correlator for performing an arithmetic operation of correlation between said training symbol supplied from said training symbol storage means and the output signal supplied from said unnecessary frequency component removal means to thereby obtain an instantaneous value of impulse response of a path channel of said received signal; and an impulse response accumulator for accumulating the obtained instantaneous values of impulse response to thereby obtain accumulated impulse response and outputting said accumulated impulse response as impulse response of a path channel of said received signal.

4. A demodulator according to claim 1, wherein:

said digital received signal is composed of digital data having a frame structure in which a frame having a sequence of more training symbols than those of another frame is added to a head of said digital data having said frame structure; and said means for obtaining an instantaneous value of impulse response performs an arithmetic operation of correlation between said training symbol supplied from said storage means and the training symbol sequence in said head frame of the output signal supplied from said unnecessary frequency component removal means to thereby perform initial convergence of delay spread.

5. A demodulator according to claim 1, wherein:

said threshold storage means stores a threshold of delay spread obtained in advance as a function of either one of a carrier-to-noise power ratio and average received signal power and a maximum Doppler frequency in the output signal supplied from said unnecessary frequency component removal means; and said demodulator further comprises:

means for obtaining either one of a carrier-to-noise power ratio and average received signal power in the output signal supplied from said unnecessary frequency component removal means; and means for obtaining a maximum Doppler frequency in the output signal supplied from said unnecessary frequency component removal means; whereby said threshold storage means reads a threshold of delay spread on the basis of the obtained either one of the carrier-to-noise power ratio and the average received signal power and the obtained maximum Doppler frequency.

6. A demodulator according to claim 1, wherein:

said adaptive equalizer includes a linear equalizer; and said decoding means includes a symbol decision unit, and a decoder.

7. A demodulator according to claim 1, wherein:

said adaptive equalizer includes a maximum likelihood sequence estimator;

said decoding means includes a symbol decision unit, and a decoder; and said switching means supplies the output signal from said unnecessary frequency component removal means to said decoder through said adaptive equalizer when the obtained measured value of delay spread is larger than the threshold stored in said threshold storage means, and supplies the output signal from said unnecessary frequency component removal means to said decoder through said symbol decision unit when the obtained measured value of delay spread is not larger than the threshold stored in said threshold storage means.

8. A demodulator for constituting a digital communication receiver, comprising:

a detector for converting a digital received signal into a base band signal;

an unnecessary frequency component removal means for removing unnecessary frequency components from a signal supplied from said detector thereby to output a signal from which the unnecessary frequency component has been thus removed;

means for obtaining a measured value of delay spread of the output signal supplied from said unnecessary frequency component removal means;

an adaptive equalizer for performing adaptive equalization on the output signal supplied from said unnecessary frequency component removal means;

a decoding means for decoding an input signal; and means for supplying the output signal from said unnecessary frequency component removal means to said decoding means through said adaptive equalizer when the measured value of delay spread is larger than a predetermined value, while supplying the output signal from said unnecessary frequency component removal means to said decoding means without being passed through said adaptive equalizer when the measured value of delay spread is not larger than said predetermined value.

9. An adaptive equalization unit in a demodulator for constituting a digital communication receiver, comprising:

means for obtaining a measured value of delay spread of a signal obtained by conversion of a digital received signal into a base band signal;

an adaptive equalizer for performing adaptive equalization on the signal obtained by said conversion; and means for outputting the signal obtained by said conversion through said adaptive equalizer when the measured value of delay spread is larger than a predetermined value, while outputting the signal obtained by said conversion without being passed through said adaptive equalizer when the measured value of delay spread is not larger than said predetermined value.

10. A demodulation method in digital communications, comprising the steps of:

(a) converting a digital received signal into a base band signal;

(b) removing unnecessary frequency components from a signal obtained by said conversion;

(c) obtaining a measured value of delay spread of the signal after removal of the unnecessary frequency components;

(d) performing adaptive equalization on the signal after removal of the unnecessary frequency components and then decoding the signal, when the measured value of delay spread is larger than a predetermined value; and (e) decoding the signal after removal of the unnecessary frequency components without performing adaptive equalization when the measured value of delay spread is not larger than said predetermined value.

11. A demodulation method according to claim 10, wherein said step (c) includes the steps of:

(c1) obtaining impulse response of a path channel of said received signal on the basis of a training symbol supplied from a training symbol storage means for storing said training symbol and the signal after removal of the unnecessary frequency components; and (c2) obtaining a measured value of delay spread from the obtained impulse response.

12. A demodulation method according to claim 11, wherein said step (c1) has the substeps of:

obtaining an instantaneous value of impulse response of a path channel of said received signal on the basis of said training symbol supplied from said training symbol storage means and the signal after removal of the unnecessary frequency components; and removing instantaneous response components from said obtained instantaneous value of impulse response and suppressing noise components in said obtained instantaneous value of impulse response to thereby obtain impulse response of a path channel of said received signal.

13. A demodulation method according to claim 11, wherein said step (c1) includes the substeps of:

performing an arithmetic operation of correlation between said training symbol supplied from said training symbol storage means and the signal supplied from said unnecessary frequency component removal means to thereby obtain an instantaneous value of impulse response of a path channel of said received signal; and accumulating said obtained instantaneous value of impulse response to thereby obtain accumulated impulse response as impulse response of a path channel of said received signal.

14. A demodulation method according to claim 10, wherein:

said digital received signal is composed of digital data having a frame structure in which a frame having a sequence of more training symbols than those of another frame is added to a head of said digital data having said frame structure; and the step for obtaining an instantaneous value of impulse response performs an arithmetic operation of correlation between said training symbol supplied from said storage means and the training symbol sequence in said head frame of the signal after removal of the unnecessary frequency components to thereby perform initial convergence of delay spread.

15. A demodulation method according to claim 10, further comprising the steps of:

storing in a threshold storage means a threshold of delay spread obtained in advance as a function of either one of a carrier-to-noise power ratio and average received signal power and a maximum Doppler frequency in the signal after removal of the unnecessary frequency components;

obtaining the either one of the carrier-to-noise power ratio and the average received signal power in the signal after removal of the unnecessary frequency components;

obtaining the maximum Doppler frequency in the signal after removal of the unnecessary frequency components; and reading a threshold of delay spread from said threshold storage means in accordance with the obtained either one of the carrier-to-noise power ratio and the average received signal power and the obtained maximum Doppler frequency.

* * * * *